United States Patent [19]

Neitzel

[11] 4,129,642
[45] Dec. 12, 1978

[54] PROCESS FOR THE PRODUCTION OF POTASSIUM SULFATE

[75] Inventor: Ulrich Neitzel, Heringen, Germany

[73] Assignee: Kali & Salz AG, Kassel, Germany

[21] Appl. No.: 816,964

[22] Filed: Jul. 19, 1977

[30] Foreign Application Priority Data

Sep. 24, 1976 [DE] Fed. Rep. of Germany ....... 2643001

[51] Int. Cl.² .......................... C01D 5/00; C01D 5/12
[52] U.S. Cl. .................................... 423/199; 423/166; 423/197
[58] Field of Search ...................... 23/299, 302 R, 304; 423/166, 199, 197, 184

[56] References Cited

U.S. PATENT DOCUMENTS

| | | | |
|---|---|---|---|
| 2,437,182 | 3/1948 | Barr et al. | 23/304 |
| 3,058,806 | 10/1962 | Ebner | 423/199 |
| 3,110,561 | 11/1963 | Henne et al. | 423/199 |
| 3,207,576 | 9/1965 | Marullo et al. | 423/199 |
| 3,353,927 | 11/1967 | Ralston | 23/304 |
| 3,499,725 | 3/1970 | Scarfi et al. | 423/166 |
| 3,644,102 | 2/1972 | Svande | 23/302 |
| 3,833,709 | 9/1974 | Chassagne | 23/299 |

Primary Examiner—O. R. Vertiz
Assistant Examiner—Wayne A. Langel
Attorney, Agent, or Firm—Anthony DeLaurentis

[57] ABSTRACT

Potassium sulfate is produced from a mixture of carnallite, potassium chloride, kieserite and residual quantities of less than 15% by weight of rock salt by treating the mixture at a temperature of 20°–40° C with potash magnesia liquor to form a slurry with at most 70 mole $MgCl_2/1000$ mole $H_2O$, whereafter the liquor portion of the slurry comprising a solution saturated with carnallite and rock salt is separated from the solid substance, which solid substance is then converted at temperatures of 75°–110° with a sulfate liquor, which contains 18–45 mole $MgCl_2/1000$ mole $H_2O$, into a mixture of langbeinite and potassium chloride, which mixture after separation from the liquor is treated at temperatures of 15°–110° C with a sulfate liquor containing 18–50 mole $MgCl_2/1000$ mole $H_2O$, whereupon the crystallizate is separated from the mother liquor and is converted with water to potassium sulfate.

18 Claims, 2 Drawing Figures

PROCESS FOR THE PRODUCTION OF POTASSIUM SULFATE

BACKGROUND OF THE INVENTION

As is well known, a mixture of potassium chloride and kieserite (magnesium sulfate), separated electrostatically from ground crude salt, may be used for the production of potassium sulfate. For example, such a mixture of potassium, chloride and kieserite may be reacted in an integrated two step process, wherein the first step comprises reacting the salt mixture with a sulfate liquor that is obtained from the second step of the process to form a mixture of a potassium magnesium double sulfate salt such as, for example, schoenite, $K_2SO_4 \cdot MgSO_4 \cdot 6H_2O$ or leonite, $K_2SO_4 \cdot MgSO_4 \cdot 4H_2O$ and potassium chloride. This mixture may then be subjected to the second step wherein the mixture is converted with water into potassium sulfate and the sulfate liquor that is used in the first processing step. The resulting potassium sulfate is separated as the product, while the sulfate liquor is returned to the process. Such a process is proposed, for example, in the German AS No. 1,923,514.

Although processes of the above type may be utilized to produce potassium sulfate, they are characterized by an inherent disadvantage since kieserite reacts relatively slowly. Accordingly, efforts have been made to change the relatively slow reacting kieserite into a faster reacting form so as to facilitate its conversion to potassium sulfate. For example, in accordance with one previously known process, the potassium chloride-kieserite mixture may be activated by grinding the same to a very finely divided state. In still another known process, the mixture may be activated by heating the same to temperatures above 200° C. These activating measures however, require an additional expenditure of apparatus and power.

SUMMARY OF THE INVENTION

Therefore, it is an object of the present invention to produce potassium sulfate by a process which avoids the deficiencies of the prior art.

It is another object of the invention to provide a process for the production of potassium sulfate from a mixture of carnallite, kieserite and residual quantities of rock salt, separated electrostatically from hard salt, i.e., ground crude salt, by a process which eliminates the need for any additional expenditures in terms of apparatus and power.

In accordance with the present invention, these and other objects and advantages are accomplished by producing potassium sulfate from a mixture of carnallite, potassium chloride, kieserite and residual quantities of rock salt, separated electrostatically from crude salt, in an integrated multi-step process, wherein a sulfate liquor from the second step of the process is used to convert the mixture of carnallite, potassium chloride, kieserite and residual rock salt in the first step of the process into a mixture of a potassium-magnesium double sulfate salt and potassium chloride, and wherein the mixture of the double sulfate salt and potassium chloride is converted by the action of water into potassium sulfate and sulfate liquor which, after separation of the potassium sulfate, is returned to the first step of the process. According to the invention, the mixture of carnallite, potassium chloride, kieserite and residual quantities of less than 15% by weight of rock salt is mixed at a temperature of 20°–40° C. with a potash magnesia liquor to form a slurry with at most 70 mole $MgCl_2/1000\ H_2O$. The resulting solution, which is saturated with carnallite and rock salt, is separated from the solid substance, which solid substance is converted at temperatures of 75°–110° C. with a sulfate liquor, which contains 18–45 mole $MgCl_2/1000\ H_2O$, into a mixture of langbeinite and potassium chloride. After separation from the liquor, the mixture of langbeinite and potassium chloride is treated at temperatures of 15°–110° C. with a sulfate liquor which contains 18–50 mole $MgCl_2/1000\ H_2O$, whereupon the crystallizate is separated from the mother liquor and converted with water to potassium sulfate. The potassium sulfate is separated as product from the sulfate liquor which is returned to the process.

BRIEF DESCRIPTION OF THE DRAWING

The invention will be understood more fully by reference to the following detailed description of specific embodiments thereof, particularly when taken in conjunction with the drawing wherein.

DETAILED DESCRIPTION

Figure 1:
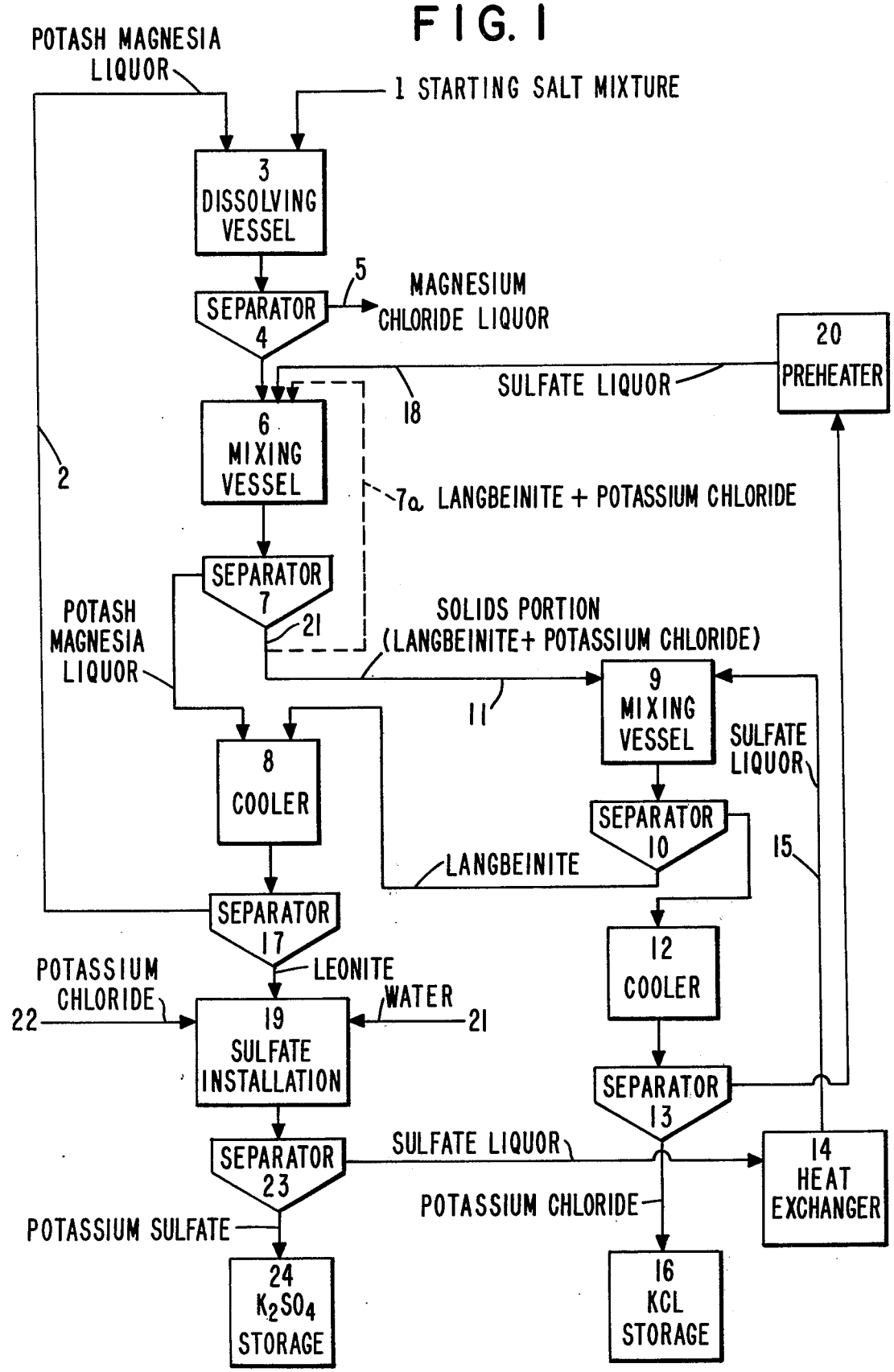
FIG. 1 is a schematic flow diagram of one embodiment of the process for preparing potassium sulfate in accordance with the present invention.

In order to carry out the process of the invention, a mixture of carnallite, potassium chloride, kieserite and residual quantities of rock salt is used as the starting material. In one embodiment, this starting material is obtained by electrostatically separating the mixture from ground potassium crude salt, especially hard salt, by means of known electrostatic separating processes. Although mixtures containing various amounts of halite and anhydrite, in addition to the carnallite, potassium chloride and kieserite, are suitable for use in the process of the invention, mixtures which contain no more than 5–15% by weight, preferably below 8% by weight of halite and less than 0.6% by weight anhydrite are particularly useful. For example, a mixture of 23% by weight of kieserite, 20% by weight of carnallite, 35% by weight of sylvite and 13% by weight of halite may be used as starting material for carrying out the process of the invention.

According to the invention, before the mixture of carnallite, potassium chloride, kieserite and residual rock salt is converted with the sulfate liquor, the magnesium chloride contained in the carnallite is dissolved out as much as possible. This is accomplished by using a potassium magnesia liquor which is mixed to form a slurry with the starting mixture at temperatures of 20°–40° C., which slurry might contain at most 70 mole $MgCl_2/1000\ H_2O$. Consequently, the quantity of potash magnesia liquor to be used per part by weight of starting mixture must be selected such that the sum of the $MgCl_2$ content of the carnallite and of the potash magnesia liquor does not exceed the value of 70 mole $MgCl_2/1000\ H_2O$ in the slurry. Advantageously, the potash magnesia liquor that is used for dissolving the magnesium chloride contained in the carnallite has itself a content of magnesium chloride which lies at about 170 g/l $MgCl_2$. Also, it is desirable to agitate the slurry until the carnallite has practically completely decomposed and the magnesium chloride freed thereby has been largely dissolved.

The slurry is then transferred into a settling tank in which the magnesium chloride solution, now developed from the potash magnesia liquor, is largely separated from the solid substance. It is sufficient, if as part of the solid substance a slurry is obtained, the solid substance content of which amounts to about 50% by weight. This type of separation of liquor and solids is completely sufficient for execution of the process of the invention in this and the other steps of the process. Of course, it will be appreciated that the solids may also be isolated from the liquor portion of the slurry by filtering, centrifuging or the like.

Smaller quantities of the magnesium chloride solution obtained by the previously described processes, together with potash magnesia liquor may be used as starting materials for the process of the invention.

The separated portion of solid matter is a mixture, which consists in its principal quantity of sylvite and kieserite and contains only negligibly small quantities of other salts. This salt mixture is mixed into a slurry at temperatures of 75°–110° C. with a sulfate liquor, which contains 18-45 mole $MgCl_2/1000$ $H_2O$. The sulfate liquor used here is to be saturated as much as possible with potassium chloride, in order to achieve a substantial conversion of the kieserite with the sylvite into langbeinite. In order to promote the formation and crystallization of the langbeinite, it may be advantageous to add seed crystals of langbeinite to this mixture. Langbeinite crystals originating in the process may be used for this purpose. The slurry developed contains essentially a mixture of langbeinite and potassium chloride as solid matter.

The langbeinite-potassium chloride slurry obtained in this manner is cooled to temperatures of 15°–60° C. By the selection of temperature, the further course of the process of the invention may be varied. Whenever, for example, one operates at a temperature between 35° and 60° C., leonite will develop. For this, the slurry must again and again be fluidized by stirring or other corresponding measures, until the formation of leonite is completed. If during this treatment, on the contrary, a temperature of 15°–35° C. is maintained in the slurry, with all other conditions being equal, then schoenite develops.

The corresponding mixtures of hydrates of the potassium and magnesium double sulfate are obtained in a mixture with potassium chloride, which is separated from the liquor either by settling, by filtering, or the like. The separated mixture of solid matter is subsequently converted with water, in a manner known per se into potassium sulfate and magnesium chloride, which remains dissolved in the developing sulfate liquor. In this regard, when the potassium chloride content of the solids mixture is insufficient to convert completely the magnesium sulfate present in the solids mixture, then advantageously an addition quantity of potassium chloride is fed to the mixture of water and solid matter.

However, there also is the possiblity of treating the mixture of langbeinite and potassium chloride with a hot sulfate liquor unsaturated with potassium chloride, for example, containing 18-50 mole $MgCl_2/1000$ $H_2O$, and to dissolve the potassium chloride in this manner completely out of the mixture of solids. The quantity of the sulfate liquor to be used for this purpose is to be selected such that it will be capable of selectively dissolving the potassium chloride mixed with the langbeinite. The liquor separated from the langbeinite is then cooled in order to separate from it the dissolved quantity of potassium chloride. The potassium chloride that crystallizes out from the liquor is then separated therefrom by filtration or centrifuging, and the liquor obtained may be used again for the treatment of a mixture of langbeinite and potassium chloride. The langbeinite thus obtained, and the extracted potassium chloride may be used again separately.

As has been mentioned, it is sufficient for the purposes of this invention to consider slurries having a solids content of about 50% by weight as being solids whenever the separation of these solids from their liquors is accomplished by a settling technique. However, whenever the separation is accomplished by a more severe technique such as, for example, by filtration or centrifugation, the solids content of the solid residues separated from the liquors will be considerably higher. In this latter regard, whenever such high solids content residues are to be redispersed into a slurry with the liquors of the next step in the process, it will be advantageous to adjust the solids content of the residues such that the resulting slurry will have the same composition as after a separation of the solid matter by a settling technique.

The drawings are flow diagrams showing preferred ways in which the principles of the present invention can be applied to the production of potassium sulfate. With reference to both figures, hereinafter described in detail, it will be understood that the various equipment shown in the drawing is shown in the singular for simplicity, but that each singular item of equipment shown can stand for one or more of the same kind of item (vessels, separators, etc.) connected in series or parallel arrangement as necessary or desired. For clarity, only the major equipment is represented in the drawing. Instruments, agitators, pumps, valves and the like are not shown, but are to be employed in conventional manner where necessary or desirable. Thus, with specific reference to FIG. 1, there is shown a suitable tank or dissolving vessel 3 which is fed through line 1 with a starting salt mixture. The potash magnesia liquor which is used to treat the starting salt mixture is introduced into the dissolving vessel 3 through line 2. Means (not shown) are provided for subjecting the salt mixture and potash magnesia liquor to intensive agitation while they are within the dissolving vessel. By selectively adjusting the quantities of salt mixture and liquor dosed into the vessel 3, the hold time of the slurry developing therein is adjusted such that the rock salt contained in the starting salt mixture is dissolved and the carnallite, which is likewise present therein, is decomposed. The slurry is then transferred to a conventional separating arrangement 4, in which the magnesium chloride solution portion of the developed slurry is separated from the solids portion thereof. The magnesium chloride liquor is removed through line 5 and the solids portion of the slurry is advanced to a suitable vessel 6 which is provided with conventional mixing means (not shown). Sulfate liquor, which is produced in a later stage of the process and which is heated in a preheater 20, is fed from the preheater 20 to the vessel 6 through line 18. The mixture of the solids from the separator 4 and the sulfate liquor from preheater 20 is maintained in the vessel 6 under agitation and at a temperature of 75°–110° C. until the kieserite and potassium chloride contained therein have been converted into a mixture of langbeinite and potassium chloride. After such conversion has taken place, the resulting slurry is separated in a separating arrangement 7 into a solids portion and a potash magnesia liquor portion. The solids portion, which consists of langbeinite and potassium chloride, is removed from the separating arrangement 7 and is fed through line 11 to a mixing vessel 9 wherein the solids portion is intermixed with a sulfate liquor unsaturated with potassium chloride. The sulfate liquor, which is produced in a later step of the process is fed to the mixing vessel 9 through line 15. The sulfate liquor is heated in a conventional heat exchanger 14 prior to being fed to the mixing vessel 9 such that the temperature of the resulting slurry in vessel 9 is close to the boiling point thereof. After the potassium chloride, accompanying the langbeinite, has been dissolved the langbeinite remaining as a solid substance is separated from the sulfate liquor in a separating device 10. The separated liquor is cooled to room temperature in a cooled 12 and is then freed of potassium chloride in a separating device 13, the potassium chloride crystallizing from the separated liquor during cooling. This potassium chloride is collected as a product and is stored in suitable vessel 16. The langbeinite which is separated as solids in separator 10 is introduced into a cooling installation 8, as is the potash magnesia liquor portion from the separator 7. Also, if desired, a portion of the langbeinite-containing solids recovered from the separator 7 may also be fed directly to the cooling installation 8. In the cooling installation 8, the mixture of langbeinite and potash magnesia liquor is cooled to about 35°-60° C. and the langbeinite is converted into leonite at the same time. The potash magnesia liquor is separated in a suitable separating device 17, and is fed to the mixing vessel 3. The solid matter (leonite) which is recovered from the separator 17 moves into a sulfate installation 19, which is supplied with water through line 21 and, if necessary or desired, with potassium chloride through line 22. After conversion of the leonite in the sulfate installation 19 into potassium sulfate and sulfate liquor, the resulting slurry is introduced into a separating device 23. Product potassium sulfate is recovered from the separator 23 as a solid and is delivered to a suitable storage receptacle 24, whereas the sulfate liquor is fed through the heat exchanger 14 to the mixing vessel 9.

As indicated by the dashed lines in FIG. 1, a small fraction of the langbeinite-containing solids portion separated from the potash magnesia liquor portion in separator 7 may be recycled to mixing vessel 6. When this is done, the langbeinite crystals contained in the recycled fraction act as seed crystals which promote the formation and crystallization of the developing langbeinite.

Figure 2:
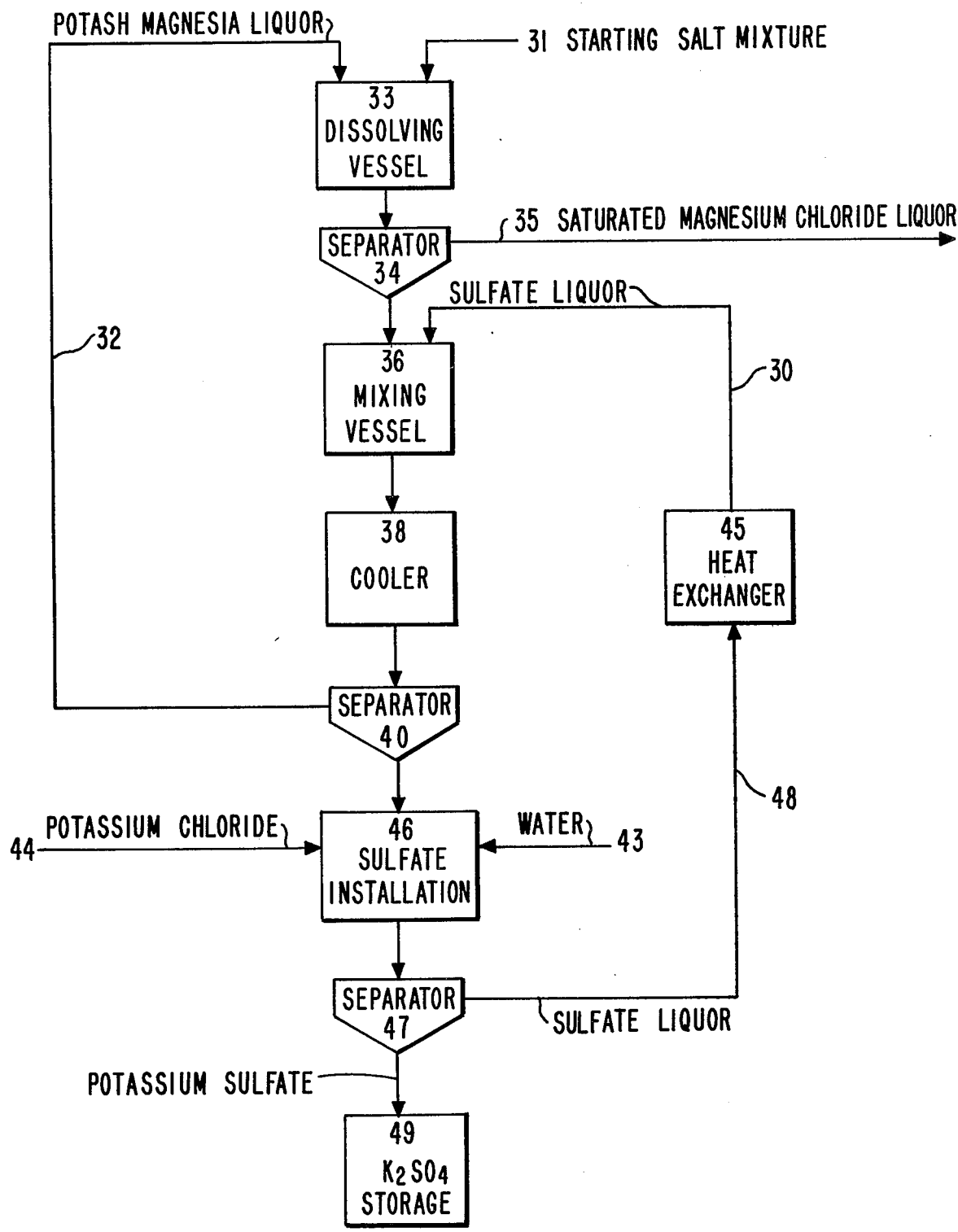
FIG. 2 is a schematic flow diagram of a second alternative process embodying the principles of the present invention.

According to an alternative procedure, shown schematically in FIG. 2, the starting salt mixture is introduced through line 31 into a suitable vessel or dissolving arrangement 33, and a potash magnesia liquor, which is recovered from a suitable separating device 40, is introduced therein through line 32. The slurry which develops in the mixing vessel 33 is held therein until the carnallite contained in the starting salt mixture is decomposed and is then fed to a separating device 34. A liquor saturated with magnesium chloride is removed from the separator 34 through line 35 and is discharged. The solid portion is fed from the separating arrangement 34 to a mixing vessel 36, where it is mixed with a sulfate liquor recovered from a separating device 47 in a later stage of the process. The sulfate liquor is passed from the separating device 47 and through a heat exchanger 45 before being fed to the mixing vessel 36 through line 30 such that the temperature of the resulting slurry in vessel 36 is kept at about 75°-110° C. After the formation of langbeinite has been concluded in this slurry (which consists essentially of langbeinite and potassium chloride), the slurry is fed to the cooling arrangement 38. As mentioned briefly above, the temperature of the slurry in the cooling arrangement 38 determines the composition of the double sulfatic salt that forms therein. For example, if the temperature of the slurry is maintained at 15°-35° C., a mixture of schoenite and potassium chloride develops. Whereas, if the contents of the cooling arrangement is kept at a temperature of 35°-60° C., a mixture of leonite and potassium chloride is formed. At any rate, the slurry which is formed in the cooling arrangement 38 is fed to a separating apparatus 40 from which a potash magnesia liquor portion and a double sulfatic salt-containing solids portion are obtained. As indicated above, the potash magnesia liquor portion is fed through line 32 to the mixing vessel 33. The solids portion from the separator 40 is introduced into the sulfate installation 46, which installation is supplied with water through line 43 and, if needed, with potassium chloride through line 44. The slurry recovered from the sulfate installation 46 is separated in a separating arrangement 47 into sulfate liquor and product potassium sulfate. The product potassium sulfate is removed and a suitable storage arrangement 49, while the sulfate liquor is fed through line 48 to the heat exchanger 45 from which it is returned into the mixing tank 36.

As indicated above, the present process offers a number of advantages over the prior art. Thus, for example, a working material fraction, separated by electrostatic separation from a potassium crude salt, may be processed with the process of the invention directly and at a high yield into potassium sulfate, without there being any need for a previous separation of the kieserite on the one hand and of the sylvite on the other hand. Furthermore, there is a possibility according to the invention of subjecting the working material fraction obtained after the first electrostatic separation to a simplified dissolving process, in the course of which first the carnallite and the rock salt are dissolved out of the working material fraction. Then, kieserite, which is slow reacting, can be converted without additional measures in a technically simple manner into langbeinite which is more capable of reacting. The langbeinite may then be converted directly or by way of leonite or schoenite into potassium sulfate. In this course of the process of the invention, a separation of the intermediate products by power consuming measures, such as for example, filtration or centrifugation is not required. Rather, the intermediate products can be isolated in the form of a slurrry with a solid content of about 50% by weight in technically simply constructed settling arrangements without special expenditure of power and then can be fed, as such, to the next reaction vessel. As a result of these characteristics, the process of the invention may operate in relatively simple apparatus with low power expenditure.

The advantages of the invention will be appreciated even more fully in view of the following example which is not intended to limit the scope of the invention.

EXAMPLE 10 parts by weight of a mixture of 22% by weight of carnallite, 32% by weight of sylvite, 40% by weight of kieserite, and 6% by weight of rock salt, separated electrostatically from a crude potassium salt which is ground to an average particle size of about 0.5 to 1.5 mm., is mixed, in the mixer 33 (FIG. 2) with 21.7% by weight of potash magnesia liquor from the separating arrangement 40 until the carnallite is decomposed. The magnesium chloride solution which is formed is separated in the separating arrangement 34 and is removed through line 35. The slurry concentrate remaining as the solid portion, with a slurry density of 50%, is introduced into the mixing vessel 36. The sulfate liquor which is recovered from separator 47 and which has a concentration of 32 mole $MgCl_2/1000 H_2O$ is preheated in the heat exchanger 45 to a temperature of 100° C. and is fed to the mixing vessel 36 in a quanituty of 22.0 parts by weight through line 30. The developing slurry is kept in the mixing vessel 36 at a temperature of 100° C. until the formation of langbeinite is completed. Subsequently the mixture obtained is put into the cooling arrangement 38, in which it is cooled to a temperature of approximately 30° C. After the langbeinite has been converted into schoenite, the potash magnesia liquor is separated in the separating arrangement 40 and is fed to the mixing vessel 33 by means of line 32. The 16.4 parts by weight of slurry with 50% by weight of solid contents, remaining as a solid portion, are fed to the mixing arrangement 46 for the production of potassium sulfate. In addition to this solid portion, 8.2 parts by weight of water and 1.4 parts by weight of potassium chloride are fed to the mixing arrangement 46 counter current. After the conversion of the schoenite has been completed, 1.4 parts by weight of potassium sulfate are isolated from the reaction mixture in the separating arrangement 47 and are fed as product to the storage arrangement 49. The remaining sulfate liquor is recovered and returned to the process through line 48.

What is claimed is:
1. A process for producing potassium sulfate, which comprises:
  (a) forming a starting mixture comprising carnallite, potassium chloride, kieserite and residual quantities of less than 15% by weight rock salt by electrostatically separating a ground crude potassium salt;
  (b) contacting said starting mixture with a potash magnesia liquor at a temperature of about 20°–40° C. to form a slurry containing up to 70 mole $MgCl_2/1000 H_2O$, said contacting resulting in the decomposition of the carnallite and the dissolution of the rock salt contained in said starting mixture;
  (c) separating the slurry formed in step b) into a magnesium chloride solution and a solids portion containing a mixture of kieserite and potassium chloride;
  (d) mixing the solids portion obtained in step c) with a sulfate liquor containing 18–45 mole $MgCl_2/1000 H_2O$ at a temperature of about 75°–110° C. to convert the solids portion into a mixture of langbeinite and potassium chloride; p1 (e) cooling the mixture obtained in step d) to a temperature between about 15°–60° C. to form slurry containing a potassium-magnesium double sulfate salt and potassium chloride;
  (f) separating the slurry formed in step e) into a potash magnesia liquor portion and a double sulfate saltcontaining solids portion;
  (g) mixing the solids portion obtained in step f) with water to convert the double sulfate salt contained in said solids portion into potassium sulfate; and
  (h) separating the potassium sulfate formed in step g) from the sulfate liquor associated therewith.

2. The process of claim 1 wherein potassium chloride, in addition to water, is mixed in step g) with the solid portion obtained in step f).

3. The process of claim 2, wherein the potash magnesia liquor used in step b) is obtained from step f) of the process.

4. The process of claim 3, wherein the sulfate liquor used in step d) is obtained from step h) of the process.

5. The process of claim 4, wherein prior to cooling in step e), the mixture obtained in step d) is separated into a liquor portion and a solids portion containing essentially langbeinite and potassium chloride; wherein the separated solids portion is treated with a hot sulfate liquor which is unsaturated with potassium chloride and which contains 18–50 mole $MgCl_2/1000 H_2O$ to dissolve all of the potassium chloride contained in said solids portion; and wherein the undissolved langbeinite is separated from the resulting slurry, is combined with said liquor portion, and is treated to said cooling step e).

6. The process of claim 5, wherein potassium chloride, in addition to water, is mixed in step g) with the solids portion obtained in step f).

7. The process of claim 6, wherein said resulting slurry is cooled to crystallize potassium chloride therefrom; and wherein said crystallized potassium chloride is separated from its mother liquor.

8. The process of claim 7, wherein the mother liquor separated from said potassium chloride is used as the sulfate liquor in step d).

9. The process of claim 6, wherein a portion of the langbeinite and potassium chloride-containing solids separated from the mixture obtained in step d) is returned to step d) and used therein as a source of langbeinite seed crystals.

10. The process of claim 2, wherein said sulfate liquor used in step d) comprises 18–40 mole $MgCl_2/1000 H_2O$, and wherein the mixture formed in step d) is cooled in step e) to about 15°–35° C. to form a mixture of schoenite and potassium chloride.

11. The process of claim 2, wherein said sulfate liquor used in step d) comprises 18–40 mole $MgCl_2/1000 H_2O$, and wherein the mixture formed in step d) is cooled in step e) to about 35°–60° C. to form a mixture of leonite and potassium chloride.

12. The process of claim 3, wherein said sulfate liquor used in step d) comprises 18–40 mole $MgCl_2/1000 H_2O$, and wherein the mixture formed in step d) is cooled in step e) to about 35°–60° C. to form a mixture of leonite and potassium chloride.

13. The process of claim 3, wherein said sulfate liquor used in step d) comprises 18–40 mole $MgCl_2/1000 H_2O$, and wherein the mixture formed in step d) is cooled in step e) to about 15°–35° C. to form a mixture of schoenite and potassium chloride.

14. The process of claim 4, wherein said sulfate liquor used in step d) comprises 18–40 mole $MgCl_2/1000 H_2O$, and wherein the mixture formed in step d) is cooled in step e) to about 15°–35° C. to form a mixture of schoenite and potassium chloride.

15. The process of claim 4, wherein said sulfate liquor used in step d) comprises 18–40 mole $MgCl_2/1000 H_2O$, and wherein the mixture formed in step d) is cooled in step e) to about 35°–60° C. to form a mixture of leonite and potassium chloride.

16. The process of claim 1, wherein the sulfate liquor used in step d) is obtained from step h) of the process.

17. The process of claim 16, wherein said sulfate liquor used in step d) comprises 18–40 mole $MgCl_2/1000$ $H_2O$, and wherein the mixture formed in step d) is cooled in step e) to about 15°–35° C. to form a mixture of schoenite and potassium chloride.

18. The process of claim 16, wherein said sulfate liquor used in step d) comprises 18–40 mole $MgCl_2/1000$ $H_2O$, and wherein the mixture formed in step d) is cooled in step e) to about 35°–60° C. to form a mixture of leonite and potassium chloride.

* * * * *